Jan. 8, 1963
C. BRAKHAGE
3,072,201
TRACTOR-MOUNTED FOLDING DRAG HITCH
Filed Jan. 13, 1961
3 Sheets-Sheet 1
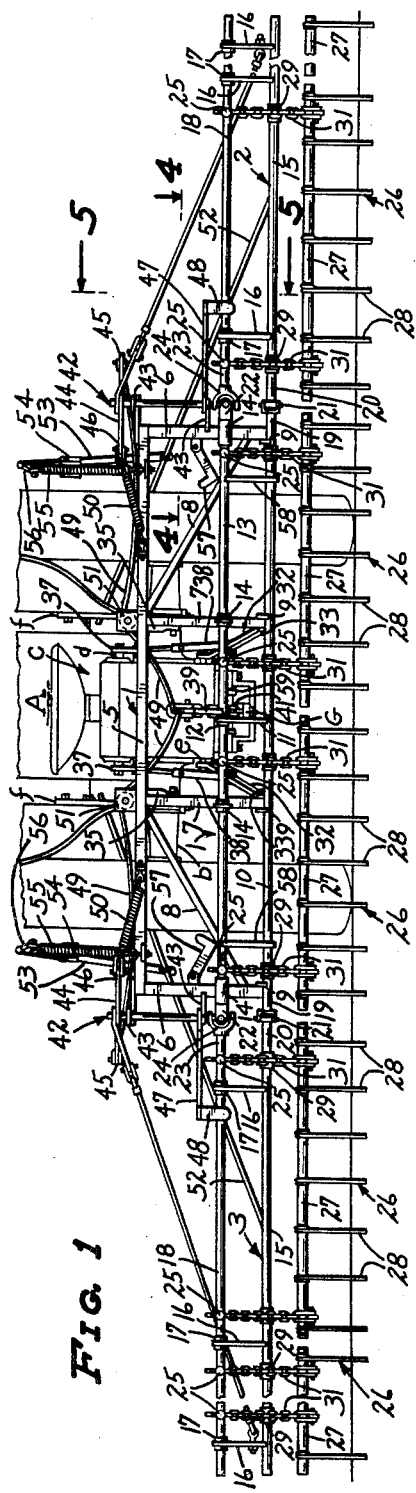
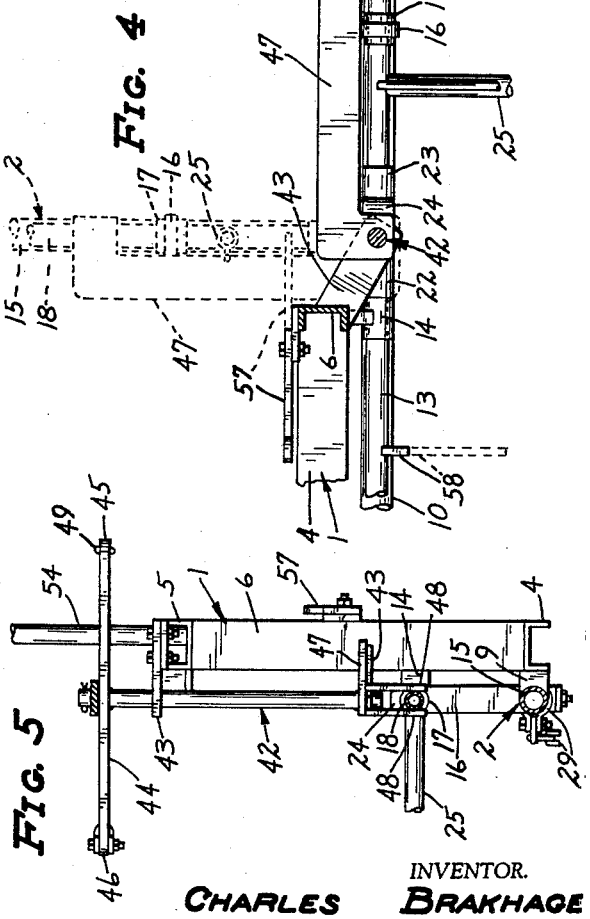
INVENTOR.
CHARLES BRAKHAGE
BY
Merchant & Merchant
ATTORNEYS

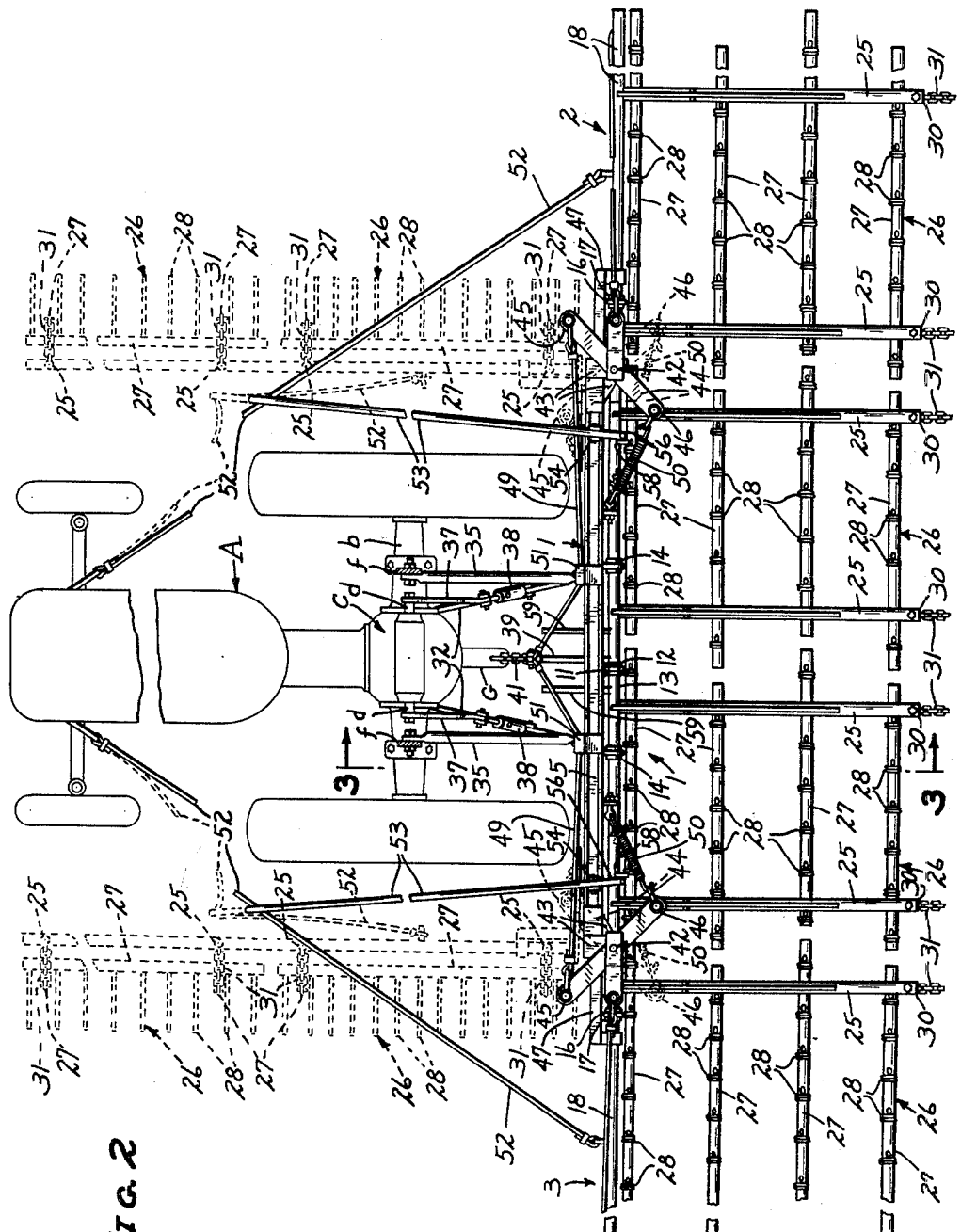

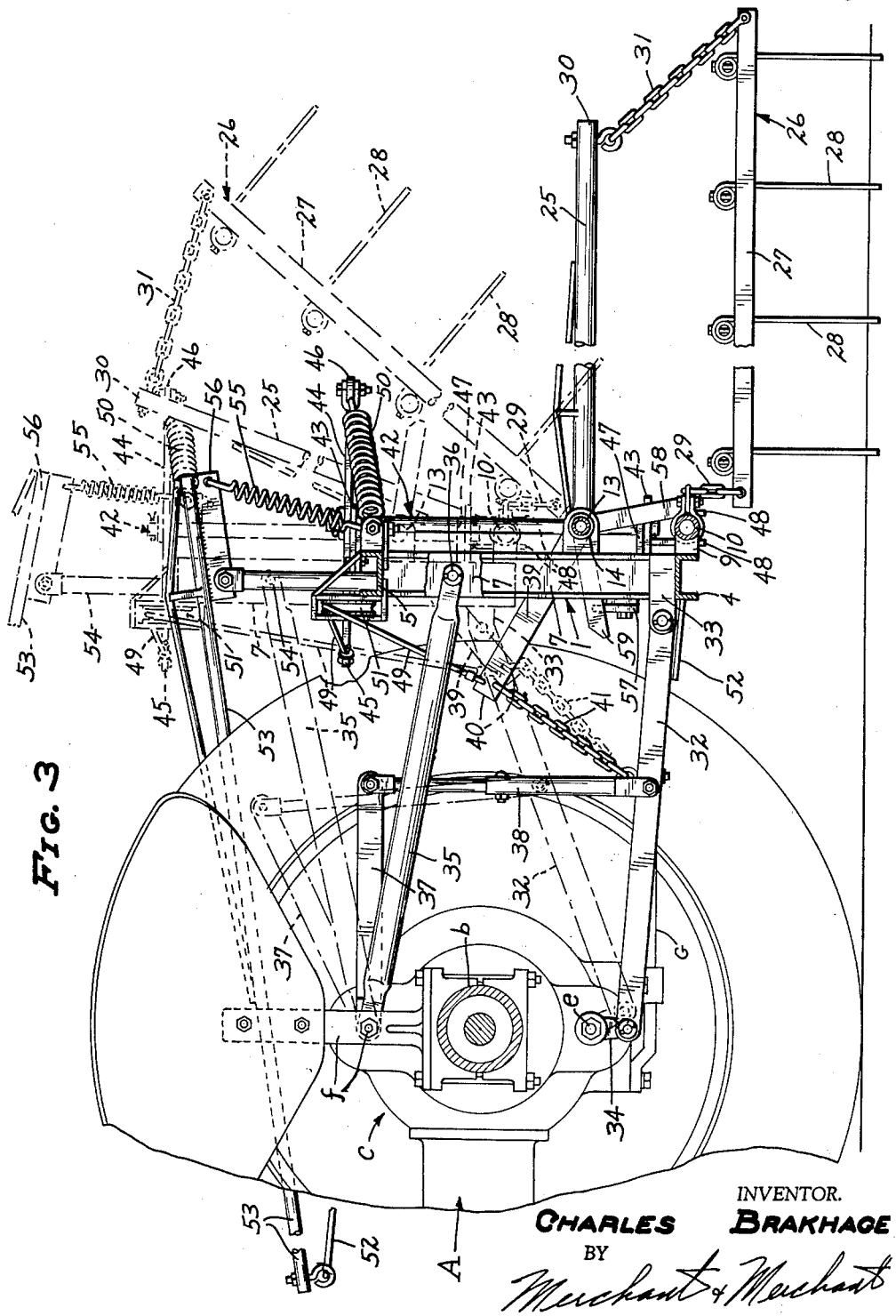

United States Patent Office 3,072,201
Patented Jan. 8, 1963

3,072,201
TRACTOR-MOUNTED FOLDING DRAG HITCH
Charles Brakhage, Murdock, Minn.
Filed Jan. 13, 1961, Ser. No. 82,617
11 Claims. (Cl. 172—456)

This invention relates generally to agricultural equipment and machinery, and more particularly it relates to a tractor-mounted folding drag hitch for use in connection with tractors of the type having transversely disposed power lift rock-shafts.

Generally, my invention comprises a central frame section, and a pair of side frame sections pivotally connected in side-by-side generally transverse alignment with the central frame section. My invention is particularly adapted to carry a ground-working agricultural implement of a substantially greater transverse dimension than the distance between the wheels of a tractor, one type of such an implement being a harrow. The use of the above described type of agricultural implements becomes particularly advantageous when several thereof can be pivotally connected in transverse end-to-end relationship whereby to greatly increase the ground coverage of the implement with each succeeding pass of the tractor. Previously known types of the above described class of folding drag hitches have usually been characterized by a folding action which comprises movements between an operative and an inoperative position wherein the side frame sections of the hitch and the implement swing about generally parallel horizontally extending axes so that said side frame sections extend in a generally vertical direction adjacent the rear of the tractor. However, such previously known types of folding actions have generally not produced optimum satisfaction since the vertically extending height of the folded side frame sections is usually substantially greater than the height of the tractor whereby to still provide a substantial amount of obnoxious interference during storage and transportation of the drag hitches.

In light of the above explanatory introduction, an important object of this invention is the provision of a folding drag hitch wherein the central frame section thereof folds from a generally horizontally rearwardly extending position at the rear of the tractor to a generally angularly upwardly extending position, and wherein the side frame sections of the drag hitch swing forwardly about the opposite ends of the central frame section to forwardly extending generally parallel positions on opposite sides of the tractor.

Another object of this inevntion is the provision of a folding drag hitch wherein the unique inoperative position of the same provides a heretofore unknown amount of compactness whereby to greatly reduce the difficulty with which the same may be stored and transported.

Another object of this invention is the provision of a folding drag hitch which is operatively connected to the power lift of a tractor and is actuated between its operative and inoperative positions by said tractor power lift.

A still further object of this invention is the provision of a tractor mounted folding drag hitch which includes novel means for providing a leveling adjustment for the hitch.

Other objects of this invention reside in the provision of a tractor-mounted folding drag hitch which may be relatively economically manufactured, which is easy to mount and install on a tractor and which may be so mounted without the use of special tools, which is durable and strong in construction, and which is highly efficient in sustaining its purposes.

The foregoing and other objects and advantages of this invention will become apparent from the following detailed specification, appended claims and attached drawings.

Referring to the drawings, wherein like reference characters indicate like parts or elements throughout the several views:

FIG. 1 is a view in rear elevation of my invention as it is mounted on the rear of a tractor, some parts being broken away;

FIG. 2 is a view in top plan thereof, some parts being broken away and some parts shown in section, and the folded inoperative position thereof being shown in dotted lines;

FIG. 3 is an enlarged view in vertical section taken on the line 3—3 of FIG. 2, some parts being broken away, and the folded inoperative position thereof being again shown in dotted lines;

FIG. 4 is an enlarged view in horizontal section taken on the line 4—4 of FIG. 1, some parts being broken away to show other parts in section, and the folded inoperative position of my invention again being shown in dotted lines; and FIG. 5 is an enlarged view in vertical section taken on the line 5—5 of FIG. 1, some parts being broken away.

Referring with greater particularity to the drawings, the reference letter A represents a tractor, which includes a rear axle b, and a conventional power lift represented generally by the reference letter c, the latter comprising an upper transversely disposed rock-shaft d and a lower transversely disposed rock-shaft e. My invention comprises the tractor-mounted folding drag hitch for use in connection with the tractor A having the power lift c. The drag hitch comprises a central frame section, represented generally by the reference numeral 1, and side frame sections represented generally by the reference numerals 2, 3, respectively, the side frame sections 2, 3 being disposed in opposite side-by-side generally transverse alignment in operating position with the central frame section 1. The central frame section 1 is constructed from a lower channel member 4, an upper channel member 5, end channel members 6, intermediate struts 7, and angle braces 8, the foregoing all being rigidly secured together, as by welding.

Referring more particularly to the central frame section 1, a plurality of rearwardly projecting lugs 9 are rigidly secured at their forward ends to the lower channel member 4. An elongated generally horizontally disposed lower bar 10 is rigidly secured to the rearward end of the lugs 9, and a transversely spaced generally upstanding arm 11 is rigidly secured at its lower end to the lower bar 10 and also defines an axially alignable bearing ring 12 at its upper end. An elongated generally horizontally disposed upper shaft 13 is journalled within the bearing ring 12 defined by the upper end of the arm 11, said upper shaft 13 being journalled in general parallelism with the lower bar 10. It is noted that the upper shaft 13 is also pivotally secured by means of bearing lugs 14 some of which are rigidly secured to the intermediate struts 7 of the central frame section 1 and others of which are secured to the end channel members 6.

Referring now to the side frame sections 2, 3, both of which are generally identical in construction, each thereof comprises an elongated generally horizontally disposed lower bar 15 and a plurality of upstanding arms 16 which are rigidly secured at their lower ends to the lower bar 15 and which define bearing rings 17 at their upper ends. Each of the side frame sections 2, 3 further comprises an elongated generally horizontally extending upper shaft 18 which is journalled within the bearing rings 17 of the upstanding arms 16. As seen particularly in FIG. 1, the outer ends 19 of the lower bar 10 of the central frame section 1 are pivotally connected to the inner ends 20 of the lower bars 15 of the side frame sections 2, 3 by means of hinges 21 for pivotal movements about generally parallel vertically extended axes. Also, the outer ends 22 of the upper shafts 13 of the central frame section 1 are pivotally connected to the inner ends 23 of the upper shafts 18 of the side frame sections 2, 3 by means of a pair of universal joints 24 for universal swinging movements in cooperation with the beforesaid pivotal movements of the hinges 21.

In accordance with my invention, and with reference particularly to FIGS. 2 and 3, a plurality of transversely spaced elongated generally parallel implement support rods 25 are rigidly but removably secured at their forward ends to the upper shafts 13 and 18 of said frame sections 1—3 in generally rearwardly projecting relationship and in general normality to said upper shafts 13 and 18. It should be understood that this invention is designed for use with any type of ground-working agricultural implement; however, for the purpose of illustration, the same is shown as equipped with conventional harrow sections 26 which are of a conventional design and comprise supporting bars 27 which carry a plurality of tines 28. The harrow sections 26 are rigidly but removably secured at their forward portions to the lower bars 10, 15 of the frame sections 1—3 by means of a plurality of link connectors 29, and are also similarly secured at their rearward portions to the rearward ends 30 of the support rods 25 by means of a plurality of chain connectors 31.

In accordance with my invention, primary linkage means is provided for mounting the central frame section 1 to the tractor A and also for actuating the folding action of the drag hitch in response to the actuation of said tractor power lift c. The primary linkage means comprises a pair of transversely spaced generally horizontally disposed elongated lower links 32 which are pivotally secured at their rearward ends to the lower channel member 4 of the central frame section 1 by means of a pair of bearing lugs 33. The lower links 32 are also pivotally secured at their forward ends to the opposite ends of the lower rock-shafts e of the tractor power lift c by means of a pair of small crank arms 34. Also, a pair of transversely spaced elongated upper links 35 are generally horizontally disposed in general parallelism with the lower links 32 and have their rearward ends pivotally secured, as at 36, to the intermediate struts 7 of the central frame section 1. The upper links 35 also have their forward ends pivotally secured to the fender brackets f of the tractor A. A pair of transversely spaced rearwardly projecting lifting arms 37 are rigidly secured at their forward ends to the opposite ends of the upper rock-shaft d of the tractor power lift c. Also, a pair of transversely spaced lifting links 38 are one each pivotally secured at their lower ends to a different one of the lower links 32 generally intermediate the opposite ends thereof, the lifting links 38 also each being pivotally secured at their upper ends to a different one of the rearward ends of the lifting arms 37. It should be noted that said primary linkage means is so arranged that when the lifting arms 37 thereof are moved in an angular direction by the actuation of the power lift upper rock-shaft d, said central frame section 1 is moved in a generally vertical direction, as shown by the broken lines of FIG. 3. It is also of importance that the above described connection of the forward ends of the lower links 32 to the crank arm-equipped lower rock-shaft e provides means whereby the relative positions between the upper links 35 and the lower links 32 many be adjusted by the actuation of the lower rock-shaft e so as to provide a leveling adjustment for the drag hitch.

With further reference to the primary linkage means, the same further includes a forwardly projecting elongated crank arm 39 which is rigidly secured at its rearward end to the upper shaft 13 of the central frame section 1, and also has its forward end 40 disposed in spaced relation to the tractor drawbar G. The forward end 40 of the crank arm 39 is pivotally but unyieldingly connected to the drawbar G by means of a short length of heavy chain 41. It now becomes evident that the vertical movement of the central frame section 1, in cooperation with the unyielding linkage of the crank arm 39 to the tractor drawbar G, results in the rotation of the upper shaft 13 of the central frame section 1 in a direction to swing the implement-supporting support rods 25 carried by the central frame section 1 between a generally horizontal ground-working lower position (as shown by the full lines of FIG. 3) and an upper inoperative position wherein the implement-carrying support rods 25 of the central frame section 1 extend generally angularly upwardly from the upper shaft 13 (as shown by the broken lines of FIG. 3).

Secondary linkage means is provided for the purpose of causing pivotal movement of the implement-carrying side frame sections 2, 3 about their pivotal connections to the central frame section 1 between a lower ground-working position (as shown by the full lines of FIGS. 2 and 4) wherein said side frame sections 2, 3 are generally coplanar with the implement-carrying central frame section 1 to an inorperative position (as shown by the dotted lines of FIGS. 2 and 4) wherein the side frame sections 2, 3 are disposed in generally forwardly projecting relationship with respect to the central frame section 1 on opposite sides of the tractor A. It should be noted that the operation of the secondary linkage means is responsive to the primary linkage means and at least partially simultaneously actuated therewith for causing the above described pivotal movement between said ground-working position and said inoperative position.

The secondary linkage means comprises a pair of elongated upstanding generally parallel rock-shafts, each represented generally by the reference numeral 42, one each of which is pivotally secured by means of the brackets 43 to the opposite ends of the central frame section 1 in spaced relation to the end channel members 6 of said central frame section 1. Each of the rock-shafts 42 defines a diametrically extending upper arm 44, sometimes referred to herein as a second arm, which is rigidly secured to the upper end of said rock shaft generally intermediate the opposite ends 45, 46 thereof. Each of the rock shafts 42 also defines a radially projecting lower arm 47, sometimes referred to herein as a first arm. As seen particularly in FIGS. 1, 4 and 5, the lower arms 47 of each of the rock shafts 42 are provided with ears 48 which engage the upper shafts 18 of the side frame sections 2, 3. It is noted that the ends 45 of the upper arms 44 of each of the rock-shafts 42 are connected by means of the flexible steel cables 49 to the forward end 40 of the crank arm 39 of the primary linkage means whereby the angular movement of the crank arm 39 about the upper shaft 13 of the central frame section 1 imparts rotation to both of the rock-shafts 42 of said secondary linkage means so that the angular movement of the upper arms 44 thereof causes the beforesaid swinging movements of said side frame sections 2, 3 whereby to move the same between said lower ground-working position and said inoperative position.

It should be noted that the ends 46 of the upper arms 44 of the rock-shafts 42 are provided with coil springs 50 which are secured to the upper channel member 5 of the central frame section 1 so as to provide a bias against the beforesaid angular movement of said upper arms 44. The steel cables 49 are carried at their intermediate portions by means of a pair of pulleys 51 which are secured to the upper channel member 5 of the central frame section 1. It is also noted that the side frame sections 2, 3, when same are in their lower inoperative positions, are pulled by and connected to the forward portion of the tractor A by means of the steel cables 52. In order to provide a support for the steel cables 52 when the side frame sections 2, 3 are in their folded positions adjacent the opposite sides of the tractor A, a pair of forwardly projecting elongated lever arms 53 are pivotally secured by means of the upstanding U-bracket-equipped pedestals 54 to the upper channel member 5 of the central frame section 1. Upward angular movement is applied to the forward ends of the lever arms 53 when said side frame sections 2, 3 move to the above described inoperative storage positions on opposite sides of the tractor A by means of a pair of coil springs 55 which are secured at their upper ends to the rearward ends 56 of the lever arms 53. The lower ends of the coil springs 55 are secured to the upper channel member 5 of the central frame section 1, as particularly shown in FIG. 1. A pair of locking hooks 57 are pivotally secured to the end channel members 6 of the central frame section 1 (see FIG. 1), and are adapted to hold the side frame sections 2, 3 in their inoperative positions on opposite sides of the tractor A. As seen particularly in FIGS. 2 and 3, a pair of stop arms 58 are secured to the upper shaft 13 and limit downward movement of the implement support rods 25, and another pair of stop arms 59 are secured to the upper shaft 13 to limit upward movement of the implement support rods 25 of the central frame section 1 and also to limit the swinging movement of the implement support rods 25 of the side frame sections 2, 3.

Having specifically described my invention, the operative simplicity thereof is thought to be easily understandable; however, it might be noted that the operation of my invention is controlled by means of the upper and lower rock-shafts $d$, $e$ of the tractor power lift $c$. As noted above, the angular movement of the lifting arms 37 in cooperation with the unyielding linkage of the crank arm 39 to the drawbar G of the tractor A imparts the above described swinging movements of the drag hitch between said ground-working operative position and said inoperative position wherein the side frame sections 2, 3 of my invention are disposed on opposite sides of the tractor A. It should again be emphasized that the actuation of the crank arm-equipped lower rock-shaft $e$ of the tractor power lift $c$ imparts a longitudinal movement to the lower links 32 whereby to provide an adjustment for leveling the drag hitch.

This invention has been thoroughly tested and found to be completely satisfactory for the accomplishment of the above objects; and while I have shown and described above a preferred embodiment thereof in which the principles of the present invention have been incorporated, I wish it to be specifically understood that the same may be modified without departure from the scope and spirit of the appended claims.

What I claim is:

1. A tractor mounted folding drag hitch for use in connection with a tractor of the type having a transversely disposed power lift rock-shaft, said hitch comprising a central frame section for supporting an implement, and a pair of implement equipped side frame sections for supporting implements and disposed in opposite side-by-side generally transverse alignment in operating position with said central frame section, said side frame sections being pivotally connected on opposite sides of said central frame section, means mounting said frame sections to said tractor adjacent the rear thereof, primary means mounting said central frame section to said tractor and also connected to said power lift rock-shaft for imparting swinging movements to said central frame section between a lower ground-working position and a generally angularly upwardly extending inoperative position in response to the actuation of said tractor power lift, and secondary means connected to each of said side frame sections and including linkage associated with said primary means and at least partially simultaneously actuated by said primary means for imparting swinging movement to said side frame sections about their pivotal connections to said central frame section between a lower ground-working position wherein said side frame sections are generally coplanar with said central frame section and an inoperative position wherein said side frame sections are disposed in generally forwardly projecting relationship on opposite sides of said tractor.

2. A tractor mounted folding drag hitch for use in connection with a tractor of the type having a transversely disposed power lift rock-shaft, said hitch comprising a central frame section for supporting an implement, a pair of side frame sections for supporting implements and disposed in opposite side-by-side generally transverse alignment in operating position with said central frame section, said frame sections each comprising an elongated generally horizontally disposed lower bar, a plurality of transversely spaced generally upstanding arms rigidly secured at their lower ends to said lower bar and defining axially alignable bearing means at their upper ends, and an elongated generally horizontally disposed upper shaft journalled within said bearing means defined by said upper ends of said arms in general parallelism with said lower bar, said drag hitch further comprising hinge means connecting the outer ends of the lower bar of said central frame section to the inner ends of the lower bar of said side frame sections for pivotal movements about generally parallel vertically extended axes, a pair of universal joints connecting the opposite outer ends of the upper shaft of said central frame section to the inner ends of the upper shafts of said side frame sections for universal swinging movements in cooperation with the beforesaid pivotal movements, primary linkage means for mounting said central frame section to said tractor and for actuating the folding action of said hitch in response to the actuation of said tractor power lift, said primary linkage means including link elements connected to said power lift rock-shaft for moving said central frame section between a lower ground-working position and a generally angularly upwardly etxending inoperative position, and secondary linkage means connected to each of said side frame sections and responsive to said primary linkage means and at least partially simultaneously actuated by said primary means for causing swinging movement of said side frame sections about their pivotal connections to said central frame section between a lower ground-working position wherein said side frame sections are generally coplanar with said central frame section and an inoperative position wherein said side frame sections are disposed in generally forwardly projecting relationship on opposite sides of the tractor.

3. A tractor mounted folding drag hitch for use in connection with a tractor of the type having a transversely disposed power lift rock-shaft and also having a rearwardly projecting drawbar, said hitch comprising a frame section for supporting an implement, said frame section including an elongated generally horizontally disposed shaft rotatably journalled by said frame section, said hitch further comprising linkage means for mounting said frame section to said tractor and for actuating the folding action of said hitch in response to the actuation of said tractor power lift, said linkage means comprising a pair of transversely spaced generally horizontally disposed elongated lower links pivotally secured at their rearward ends to said frame section and pivotally secured at their forward ends to said tractor, a pair of transversely spaced elongated upper links generally horizontally disposed in general parallelism with said lower links and having their rearward ends pivotally secured to said frame section and their forward ends pivotally secured to said tractor, a pair of transversely spaced rearwardly projecting lifting arms rigidly secured at their forward ends to the opposite ends of the power lift rock-shaft of said tractor, a pair of transversely spaced lifting links one each pivotally secured at its lower end to a different one of said lower links generally intermediate the opposite ends thereof and pivotally secured at its upper end to a different one of said lifting arms, said linkage means being so arranged that when said lifting arms are moved in an angular direction by the actuation of said power lift rock-shaft that said frame section is moved in a generally vertical direction, a forwardly projecting elongated crank arm rigidly secured at its rearward end to said shaft and having its forward end disposed in spaced relation to the drawbar of said tractor, and a connecting link pivotally secured at one end to said tractor drawbar and pivotally secured at its other end to the forward end of said crank arm, whereby the vertical movement of said frame section in cooperation with the unyielding linkage of said crank arm to said drawbar results in the rotation of said shaft in a direction to swing said frame section between a generally horizontal ground-working lower position and a generally angularly upwardly extending inoperative position.

4. A tractor mounted folding drag hitch for use in connection with a tractor of the type having a transversely disposed power lift rock-shaft and also having a rearwardly projecting drawbar, said hitch comprising a central frame section for supporting an implement, a pair of side frame sections for supporting implements and disposed in opposite side-by-side generally transverse alignment in operating position with said central frame section, said frame sections each comprising an elongated generally horizontally disposed lower bar, a plurality of transversely spaced generally upstanding arms rigidly secured at their lower ends to said lower bar and defining axially alignable bearing means at their upper ends, and an elongated generally horizontally disposed upper shaft of journalled within said bearing means defined by said upper ends of said arms in general parallelism with said lower bar, said drag hitch further comprising hinge means connecting the outer ends of the lower bar of said central frame section to the inner ends of the lower bars of said side frame sections for pivotal movements about generally parallel vertically extended axes, a pair of universal joints connecting the opposite outer ends of the upper shaft of said central frame section to the inner ends of the upper shafts of said side frame sections for universal swinging movements in cooperation with the beforesaid pivotal movements, primary linkage means for mounting said central frame section to said tractor and for actuating the folding action of said hitch in response to the actuation of said tractor power lift, said primary linkage means comprising a pair of transversely spaced generally horizontally disposed elongated lower links pivotally secured at their rearward ends to said central frame section and pivotally secured at their forward ends to said tractor, a pair of transversely spaced elongated upper links generally horizontally disposed in general parallelism with said lower links and having their rearward ends pivotally secured to said central frame section and their forward ends pivotally secured to said tractor, a pair of transversely spaced rearwardly projecting lifting arms rigidly secured at their forward ends to the opposite ends of the power lift rock-shaft of said tractor, a pair of transversely spaced lifting links one each pivotally secured at their lower ends to a different one of said lower links generally intermediate the opposite ends thereof and pivotally secured at their upper ends to a different one of said lifting arms, said primary linkage means being so arranged that when said lifting arms are moved in an angular direction by the actuation of said power lift rock-shaft said central frame section is moved in a generally vertical direction, a forwardly projecting elongated crank arm rigidly secured at its rearward end to said upper shaft of said central frame section and having its forward end disposed in spaced relation to the drawbar of said tractor, a connecting link pivotally secured at one end to said tractor drawbar and pivotally secured at its other end to the forward end of said crank arm, whereby the vertical movement of said central frame section in cooperation with the unyielding linkage of said crank arm to said drawbar results in the rotation of the upper shaft of said central frame section in a direction to swing said central frame section between a generally horizontal ground-working lower position and a generally angularly upwardly extending inoperative position, and secondary linkage means connected to each of said side frame sections and responsive to said primary linkage means and at least partially simultaneously actuated by said primary means for causing swinging movement of said side frame sections about their pivotal connections to said central frame section between a lower ground-working position wherein said side frame sections are generally coplanar with said central frame section and an inoperative position wherein said side frame sections are disposed in generally forwardly projecting relationship on opposite sides of said tractor.

5. The structure defined in claim 2 in which said secondary linkage means comprises a pair of elongated upstanding generally parallel rock-shafts one each pivotally secured at the opposite ends of said central frame section, each of said rock-shafts of said secondary linkage means defining radially projecting rigid first and second arms, said first arms each engaging a different one of the upper shafts of the adjacent side frame sections of said hitch, said second arms being connected by flexible linkage means to said link elements of said primary linkage means whereby the movement of said link elements imparts rotation to both of the rock-shafts of said secondary linkage means so that the resulting angular movement of the first arms thereof causes the beforesaid swinging movements of said side frame sections about their pivotal connections to said central frame section whereby to move the same between said lower ground-working position and said inoperative position.

6. The structure defined in claim 4 in which said secondary linkage means comprises a pair of elongated upstanding generally parallel rock-shafts one each pivotally secured at the opposite ends of said central frame section, each of said rock-shafts of said secondary linkage means defining radially projecting rigid first and second arms, said first arms each engaging a different one of the upper shafts of the adjacent side frame sections of said hitch, said second arms being connected by flexible linkage means to said forwardly projecting crank arm of said primary linkage means whereby the angular movement of said crank arm of said primary linkage means about the axis of the upper shaft of said central frame section imparts rotation to both of the rock-shafts of said secondary linkage means so that the resulting angular movement of the first arms thereof causes the beforesaid swinging movements of said side frame sections about their pivotal connections to said central frame section whereby to move the same between said lower ground-working position and said inoperative position.

7. The structure defined in claim 2 in which said hitch comprises a plurality of transversely spaced elongated generally parallel implement support rods secured at their forward ends to the upper shafts of said frame sections in generally rearwardly projecting relationship and in general normality thereto, and in which said implements which equip said frame sections are carried by said support rods and by the lower bars of said frame sections.

8. The structure defined in claim 3 in which said hitch comprises a plurality of transversely spaced elongated generally parallel implement support rods secured at their forward ends to the rotatably journalled shaft of said frame section in generally rearwardly projecting relationship and in general normality thereto, and in which said implement which equips said frame section is carried by said support rods and by said frame section.

9. The structure defined in claim 4 in which said hitch comprises a plurality of transversely spaced elongated generally parallel implement support rods secured at their forward ends to said upper shafts of said frame sections in generally rearwardly projecting relationship and in general normality thereto, and in which said implements which equip said frame sections are carried by said support rods and by the lower bars of said frame sections.

10. The structure defined in claim 3 in which the power lift of said tractor is of the type having a second transversely extending rock-shaft, and in which the lower links of said linkage means are connected at their forward ends to the second rock-shaft of the power lift of said tractor whereby the relative positions between said upper links and said lower links may be adjusted by the actuation of the second rock-shaft of said tractor power lift so as to provide a leveling adjustment for said hitch.

11. The structure defined in claim 4 in which the power lift of said tractor is of the type having a second transversely extending rock-shaft, and in which the lower links of said primary linkage means are connected at their forward ends to the second rock-shaft of the power lift of said tractor whereby the relative positions between said upper links and said lower links may be adjusted by the actuation of the second rock-shaft of said tractor power lift so as to provide a leveling adjustment for said hitch.

References Cited in the file of this patent

UNITED STATES PATENTS

| | | |
|---|---|---|
| 1,927,458 | Klise | Sept. 19, 1933 |
| 2,687,073 | Thorp | Aug. 24, 1954 |
| 2,690,110 | Crouch et al. | Sept. 28, 1954 |